United States Patent
Assouad

(10) Patent No.: US 9,454,325 B2
(45) Date of Patent: Sep. 27, 2016

(54) METHOD AND SYSTEM FOR OFFLINE DATA ACCESS ON COMPUTER SYSTEMS

(75) Inventor: Simon Assouad, Irvine, CA (US)

(73) Assignee: BROADCOM CORPORATION, Irvine, CA (US)

(*) Notice: Subject to any disclaimer, the term of this patent is extended or adjusted under 35 U.S.C. 154(b) by 1110 days.

(21) Appl. No.: 12/758,975

(22) Filed: Apr. 13, 2010

(65) Prior Publication Data

US 2011/0106906 A1   May 5, 2011

Related U.S. Application Data

(60) Provisional application No. 61/258,176, filed on Nov. 4, 2009.

(51) Int. Cl.
*G06F 15/173* (2006.01)
*G06F 3/06* (2006.01)
*G06F 11/20* (2006.01)

(52) U.S. Cl.
CPC .............. *G06F 3/065* (2013.01); *G06F 3/067* (2013.01); *G06F 3/0625* (2013.01); *G06F 3/0635* (2013.01); *G06F 11/2082* (2013.01); *Y02B 60/1246* (2013.01)

(58) Field of Classification Search
CPC .... G06F 3/0625; G06F 3/0635; G06F 3/067; G06F 3/065; G06F 11/2082; G06F 15/167; G06F 12/00; G06F 12/12; G06F 12/16; Y02B 60/1246
USPC .................................. 711/148; 709/212, 217
See application file for complete search history.

(56) References Cited

U.S. PATENT DOCUMENTS

| | | | | |
|---|---|---|---|---|
| 6,349,349 | B1* | 2/2002 | Fujita | H04N 7/17336 348/E7.073 |
| 6,393,584 | B1* | 5/2002 | McLaren et al. | 714/14 |
| 7,251,680 | B2* | 7/2007 | DeVos | H04L 51/08 709/206 |
| 7,743,292 | B2* | 6/2010 | Jing et al. | 714/719 |
| 7,835,380 | B1* | 11/2010 | Aloni et al. | 370/419 |
| 8,117,226 | B2* | 2/2012 | Samji et al. | 707/769 |
| 8,292,811 | B2* | 10/2012 | Relkuntwar | H04L 67/12 600/437 |

(Continued)

FOREIGN PATENT DOCUMENTS

| | | |
|---|---|---|
| GB | 2354610 | 3/2001 |
| GB | 2436629 | 10/2007 |
| WO | 2004012472 | 2/2004 |

OTHER PUBLICATIONS

European Search Report dated Jun. 7, 2012.

*Primary Examiner* — Kostas Katsikis
(74) *Attorney, Agent, or Firm* — Oblon, McClelland, Maier & Neustadt, L.L.P.

(57) ABSTRACT

While a computer system is in operational state, a network interface controller (NIC) in the computer system may be operable to copy select data to a secondary storage device. The secondary storage device is accessible by the NIC while the computer system is in an offline state or not operational. The NIC may be operable to provide remote accessibility to the copy of the select data stored in the secondary storage device over a network while the computer system is in the offline state and the NIC is supplied with electrical power and active. While the computer system is in the operational state and whenever a change is made to the select data, the NIC is operable to replace the copy of the select data stored in the secondary storage device with an updated copy of the select data based on the change.

19 Claims, 4 Drawing Sheets

(56) References Cited

U.S. PATENT DOCUMENTS

| | | | |
|---|---|---|---|
| 8,606,752 B1* | 12/2013 | Beatty | G06F 17/30371 707/640 |
| 8,627,025 B2* | 1/2014 | Doshi | G06F 11/1451 711/162 |
| 2002/0002593 A1* | 1/2002 | Ewing et al. | 709/212 |
| 2003/0005235 A1* | 1/2003 | Young | G06F 11/1446 711/141 |
| 2003/0014523 A1* | 1/2003 | Teloh | G06F 11/2058 709/226 |
| 2003/0065735 A1* | 4/2003 | Connor | 709/212 |
| 2003/0120740 A1* | 6/2003 | Beeman | G06F 17/3028 709/213 |
| 2003/0131068 A1* | 7/2003 | Hoshino | G06F 3/0613 709/216 |
| 2003/0236853 A1* | 12/2003 | Li et al. | 709/216 |
| 2004/0167914 A1* | 8/2004 | Tsai | H04L 67/1095 |
| 2005/0080874 A1* | 4/2005 | Fujiwara | H04L 67/1097 709/217 |
| 2005/0122986 A1* | 6/2005 | Starr et al. | 370/412 |
| 2005/0160096 A1* | 7/2005 | Lin et al. | 707/10 |
| 2005/0198368 A1* | 9/2005 | Fleming et al. | 709/238 |
| 2005/0198453 A1* | 9/2005 | Osaki | G06F 3/0617 711/162 |
| 2005/0268068 A1* | 12/2005 | Ignatius | G06F 3/0613 711/202 |
| 2006/0069769 A1* | 3/2006 | Dacosta | 709/224 |
| 2006/0288040 A1* | 12/2006 | Boerger et al. | 707/104.1 |
| 2007/0079006 A1* | 4/2007 | Oya | 709/245 |
| 2007/0130382 A1* | 6/2007 | Moll et al. | 710/22 |
| 2007/0208820 A1* | 9/2007 | Makhervaks et al. | 709/212 |
| 2008/0228896 A1* | 9/2008 | Krig | 709/212 |
| 2008/0235803 A1* | 9/2008 | Harada | G06F 21/57 726/26 |
| 2010/0174808 A1* | 7/2010 | Dabagh et al. | 709/221 |
| 2011/0296111 A1 | 12/2011 | di Bona | |

\* cited by examiner

METHOD AND SYSTEM FOR OFFLINE DATA ACCESS ON COMPUTER SYSTEMS

CROSS-REFERENCE TO RELATED APPLICATIONS/INCORPORATION BY REFERENCE

This patent application makes reference to, claims priority to, and claims benefit from U.S. Provisional Application Ser. No. 61/258,176, which was filed on Nov. 4, 2009.

The above stated application is hereby incorporated herein by reference in its entirety.

FIELD OF THE INVENTION

Certain embodiments of the invention relate to data communications. More specifically, certain embodiments of the invention relate to a method and system for offline data access on computer systems.

BACKGROUND OF THE INVENTION

A computer system or computer device may be utilized to receive inputs, store and process data, and provide outputs for various applications. A computer system or computer device such as, for example, a desktop PC, a laptop PC, a notebook PC, a server, a workstation, a mobile computing device or other computing platform may comprise a storage device. The storage device may be coupled internally or externally to the computer system. The storage device may store data such as, for example, persistent data which may be accessible locally or remotely over a network. The storage device may comprise, for example, a hard disk drive (HDD), a solid-state drive (SSD) or other nonvolatile storage devices.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for offline data access on computer systems, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for offline data access on computer systems. In various embodiments of the invention, while a computer system is in operational state, a network interface controller (NIC) that is within the computer system may be operable to copy select data, which is stored in a storage device in the computer system, to a secondary storage device. The secondary storage device is accessible by the NIC while the computer system is in an offline state. While a computer system is in an offline state, the computer system is not operational and/or not ready for service. The storage device in the computer system is inaccessible by the NIC when the computer system is in the offline state. The NIC may be operable to provide remote accessibility to the copy of the select data, which is stored in the secondary storage device, while the computer system is in the offline state and the NIC is supplied with electrical power and active.

While the computer system is in the operational state, the select data stored in the storage device may be identified by the NIC based on a chosen attribute option associated with the select data. The attribute option classifies the select data as offline available data. Whenever a change is made to the select data stored in the storage device, the NIC is operable to replace the copy of the select data stored in the secondary storage device with an updated copy of the select data based on the change. The select data may comprise, for example, a photo file, a music file, a library file, a video file and/or a document file. The select data may comprise data that a user may require access to when the computer system may be offline. In other words, the select data is available or can be accessed even when the computer system is unavailable.

The secondary storage device which is accessible by the NIC while the computer system is in an offline state may be, for example, local to the NIC, and/or remote with respect to the NIC. The secondary storage device may comprise, for example, a plug-in memory card that is coupled locally or remotely to the NIC, an embedded multimedia card (EMMC) that is integrated in the computer system and/or a network-attached storage (NAS) device that is coupled to a network.

While the computer system changes from the offline state to the operational state, the NIC may be operable to compare the copy of the select data stored in the secondary storage device with the select data stored in the storage device. The select data stored in the storage device may be replaced with the copy of the select data stored in the secondary storage device by the NIC, based on a result of the comparison and/or a user configuration of the computer system.

Figure 1:
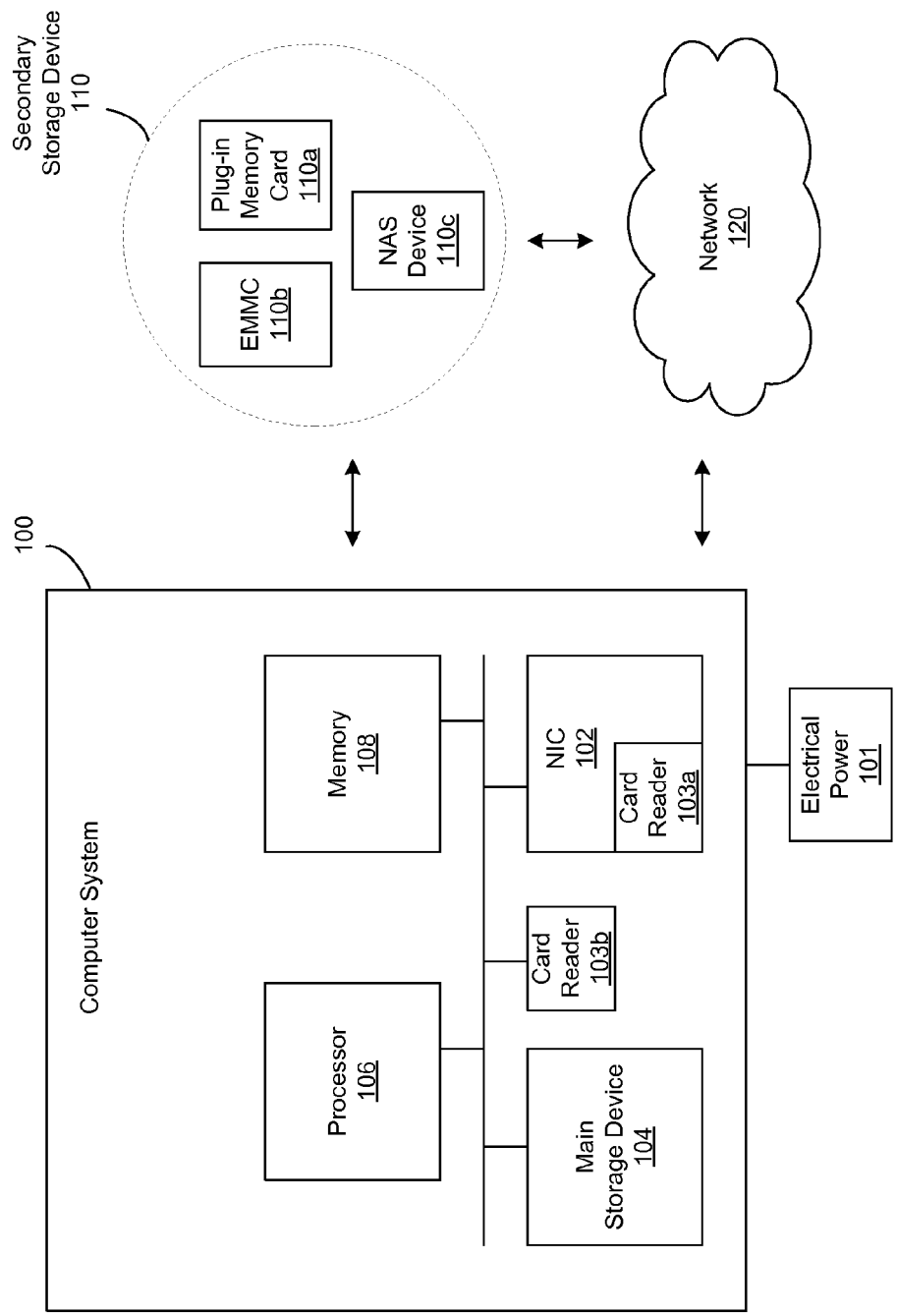
FIG. 1 is a block diagram illustrating an exemplary computer system that is operable to provide offline data access on the computer system, in accordance with an embodiment of the invention.

FIG. 1 is a block diagram illustrating an exemplary computer system that is operable to provide offline data access on the computer system, in accordance with an embodiment of the invention. Referring to FIG. 1, there is shown a computer system 100, an electrical power 101, a secondary storage device 110 and a network 120. The computer system 100 may comprise a NIC 102, a storage device 104, a processor 106, a memory 108 and a card reader 103b.

The computer system 100 may comprise suitable logic, interfaces, circuitry and/or code that may be operable to receive inputs, store and process data, and provide outputs for various applications.

The NIC 102 may comprise suitable logic, circuitry, interfaces and/or code that may be operable to provide an interface to the network 120 and allow the processor 106 to communicate data via the network 120. In an exemplary embodiment of the invention, while the computer system 100 is powered on and the processor 106 is in operational state, the NIC 102 may be operable to copy select data from the storage device 104 and store the copied select data in the secondary storage device 110. The secondary storage device 110 may be accessible by the NIC 102 while the processor 106 is in an offline state. While the processor 106 is in an offline state, the processor 106 is not operational and/or not ready to process data. The processor 106 may be in the offline state while the computer 100 and/or the processor 106 is, for example, powered off. The NIC 102 may be operable to provide remote accessibility to the copy of the select data stored in the secondary storage device 110 over the network 120 while the processor 106 is in the offline state and the NIC 102 is supplied with the electrical power 101 and active. In this regard, for example, while the computer system 100 is powered off, the NIC 102 is still active whenever the AC power cord of the computer system 100 remains plugged in an AC power source. The copy of the select data stored in the secondary storage device 110 may be accessed such as, for example, may be read, written and/or changed via the active NIC 102 by a user over the network 120 without having to keep the computer 100 and/or the processor 106 powered on and/or operational.

While the processor 106 is in the operational state, the select data stored in the storage device 104 may be identified by the NIC 102 based on a chosen attribute option associated with the select data. The attribute option classifies the select data as offline available data. Whenever a change is made to the select data stored in the storage device 104, the NIC 102 may be operable to replace the copy of the select data stored in the secondary storage device 110 with an updated copy of the select data based on the change. The select data may comprise, for example, a photo file, a music file, a library file, a video file and/or a document file.

After the power of the computer system 100 is turned on and/or the processor 106 changes from the offline state to the operational state, the NIC 102 may be operable to compare the copy of the select data stored in the secondary storage device 110 with the select data stored in the storage device 104. The select data stored in the storage device 104 may be replaced with the copy of the select data stored in the secondary storage device 110 by the NIC 102, based on a result of the comparison and/or a user configuration of the computer system 100. The user configuration may determine whether the select data may be updated or remain unchanged when the processor 106 changes from the offline state to the operational state. For example, in instances when a copy of a document file stored in the secondary storage device 110 has been changed, the NIC 102 may be configured to replace the original document file stored in the storage device 104 with the changed copy of the document file. Alternatively, based on the user configuration, the original document file stored in the storage device 104 may remain unchanged and in turn, the NIC 102 may be operable to replace the changed copy of the document file stored in the secondary storage device 110 with the original document file stored in the storage device 104.

The storage device 104 may comprise suitable logic, circuitry, interfaces and/or code that may be operable to store data such as persistent data that may be utilized by the processor 106. The storage device 104 may comprise a hard disk drive (HDD), a solid-state drive (SSD) or other non-volatile storage devices. The storage device 104 may be coupled internally or externally to the computer system 100. The data stored in the storage device 104 may comprise, for example, photo files, music files, video files and/or document files.

The processor 106 may comprise suitable logic, circuitry, interfaces and/or code that may be operable to process data. The processor 106 may execute operating system (OS) code. The OS code may enable the processor 106 to perform various process tasks. The processor 106 may be in an offline state while the computer 100 and/or the processor 106 is, for example, powered off. While the processor 106 is in the offline state, the processor 106 is not operational and/or not ready to process data.

The memory 108 may comprise suitable logic, circuitry, interfaces and/or code that may be operable to store information such as executable instructions and data that may be utilized by the processor 106. The memory 108 may comprise RAM, ROM, low latency nonvolatile memory such as flash memory and/or other suitable electrical data storage.

The secondary storage device 110 may comprise suitable logic, circuitry, interfaces and/or code that may be operable to store a copy of the select data that is stored in the storage device 104. In an exemplary embodiment of the invention, the secondary storage device 110 may be accessible by the NIC 102 while the processor 106 is in an offline state. The secondary storage device 110 may be, for example, local to the NIC 102. The secondary storage device 110 may also be, for example, remote with respect to the NIC 102. The secondary storage device 102 may comprise, for example, a plug-in memory card 110a that is coupled locally or remotely to the NIC 102, an EMMC 110b that is integrated in the computer system 100 and/or a NAS device 110c that is coupled to the network 120.

The plug-in memory card 110a may comprise suitable logic, interfaces, circuitry and/or code that may be operable to provide data storage in a non-volatile memory card. For example, the plug-in memory card 110a may comprise a secure digital (SD) card that may be coupled to the NIC 102 via a card reader 103a which is integrated in the NIC 102. The plug-in memory card 110a such as the SD card may also be, for example, coupled to the NIC 102 remotely via a card reader 103b which may be integrated in the computer system 100.

The EMMC 110b may comprise suitable logic, interfaces, circuitry and/or code that may be operable to provide data storage in an embedded flash memory card. For example, the EMMC 110b may comprise an embedded flash memory which may be integrated in a motherboard in the computer system 110.

The NAS device 110c may comprise suitable logic, interfaces, circuitry and/or code that may be operable to provide file-based data storage in a device which is coupled to a network. The NAS device 110c may use filed-based protocols and store data in a file system. For example, the NAS device 110c may comprise a file-based data storage device which may be, for example, coupled to the network 120. In this regard, a user may access data stored in the NAS device 110c over the network 120, via wired, wireless and/or any other available network medium.

The network 120 may comprise suitable logic, circuitry, interfaces and/or code that may be operable to provide data communication via wired and/or wireless technologies. The network 120 such as, for example, an Internet network may interface with the computer system 100 via the NIC 102.

In operation, while the computer system 100 is powered on and the processor 106 is in operational state, the NIC 102 may be operable to copy select data, which is stored in the storage device 104, to the secondary storage device 110. The secondary storage device 110 may be accessible by the NIC 102 while the processor 106 is in an offline state or not operational such as, for example, while the computer 100 and/or the processor 106 is powered off. The NIC 102 may be operable to provide remote accessibility to the copy of the select data stored in the secondary storage device 110 over the network 120 while the processor 106 is in the offline state and the NIC 102 is supplied with the electrical power 101 and active. In this regard, for example, while the computer system 100 is powered off, the NIC 102 is still active whenever the AC power cord of the computer system 100 remains plugged in an AC power source. The copy of the select data stored in the secondary storage device 110 may be accessed such as, for example, may be read, written and/or changed via the active NIC 102 by a user over the network 120 without having to keep the computer 100 and/or the processor 106 powered on and/or operational.

While the processor 106 is in the operational state, the select data stored in the storage device 104 may be identified by the NIC 102 based on a chosen attribute option associated with the select data. The attribute option classifies the select data as offline available data. Whenever a change is made to the select data stored in the storage device 104, the NIC 102 is operable to replace the copy of the select data stored in the secondary storage device 110 with an updated copy of the select data based on the change. The select data may comprise, for example, a photo file, a music file, a library file, a video file and/or a document file.

The secondary storage device 110 which is accessible by the NIC 102 while the processor 106 is in an offline state may be, for example, local to the NIC 102. The secondary storage device 110 may also be, for example, remote with respect to the NIC 102. The secondary storage device 110 may comprise, for example, a plug-in memory card 110a that is coupled locally or remotely to the NIC 102, an EMMC 110b that is integrated in the computer system 100 and/or a NAS device 110c that is coupled to the network 120. For example, the plug-in memory card 110a may comprise a SD card that may be coupled to the NIC 102 via the card reader 103a which is integrated in the NIC 102. The plug-in memory card 110a such as the SD card may also be, for example, coupled to the NIC 102 remotely via the card reader 103b which may be integrated in the computer system 100. The EMMC 110b may comprise an embedded flash memory which may be, for example, integrated in a motherboard in the computer system 100. The NAS device 110c may comprise a file-based data storage device which may be, for example, coupled to the network 120.

After the power of the computer system 100 is turned on and/or the processor 106 changes from the offline state to the operational state, the NIC 102 may be operable to compare the copy of the select data, which is stored in the secondary storage device 110, with the select data stored in the storage device 104. The NIC 102 may be operable to replace the select data, which is stored in the storage device 104, with the copy of the select data, which is stored in the secondary storage device 110, based on a result of the comparison and/or a user configuration of the computer system 100. For example, in instances when a copy of a document file stored in the secondary storage device 110 has been changed, the NIC 102 may be configured to replace the original document file stored in the storage device 104 with the changed copy of the document file. Alternatively, based on the user configuration, the original document file stored in the storage device 104 may remain unchanged and in turn, the NIC 102 may be operable to replace the changed copy of the document file stored in the secondary storage device 110 with the original document file stored in the storage device 104.

Figure 2:
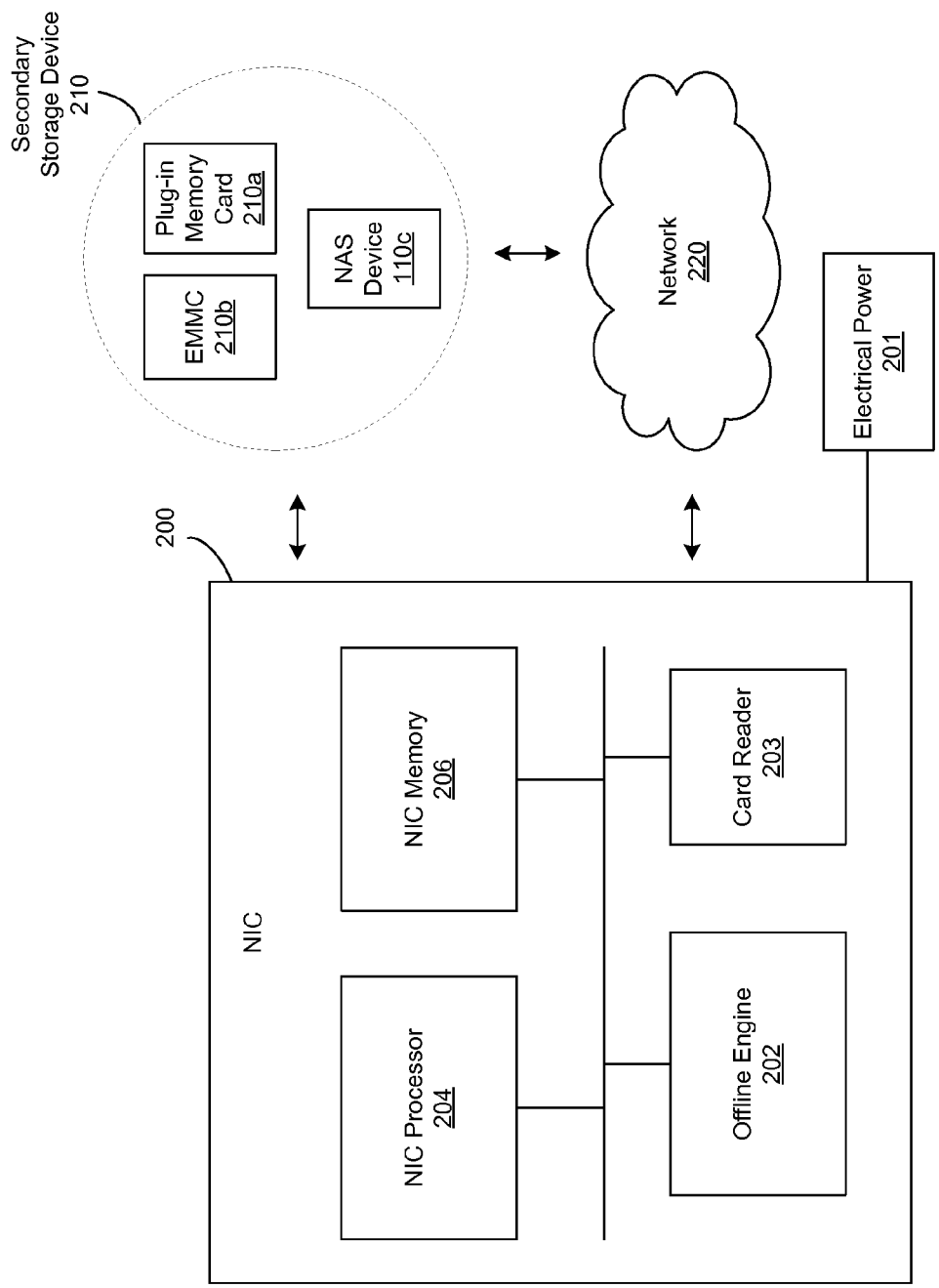
FIG. 2 is a block diagram illustrating an exemplary network interface controller (NIC) in a computer system that is operable to provide offline data access on the computer system, in accordance with an embodiment of the invention.

FIG. 2 is a block diagram illustrating an exemplary network interface controller (NIC) in a computer system that is operable to provide offline data access on the computer system, in accordance with an embodiment of the invention. Referring to FIG. 2, there is shown a NIC 200, an electrical power 201, a secondary storage device 210 and a network 220. The NIC 200 in a computer system such as in the computer system 100 described with respect to FIG. 1 may comprise an offline engine 202, a NIC processor 204, a NIC memory 206 and a card reader 203. The electrical power 201 may be substantially the same as the electrical power 101 described with respect to FIG. 1. The network 220 may be substantially the same as the network 120 described with respect to FIG. 1. The secondary storage device 210 may be substantially the same as the secondary storage device 110 described with respect to FIG. 1. The secondary storage device 210 may comprise a Plug-in memory card 210a, an EMMC 210b and a NAS device 210c. The Plug-in memory card 210a, the EMMC 210b and the NAS device 210c may be substantially the same as the Plug-in memory card 110a, the EMMC 110b and the NAS device 110c described with respect to FIG. 1.

The offline engine 202 may comprise suitable logic, circuitry, interfaces and/or code that may be operable to provide remote accessibility to a copy of select data, which is stored in the secondary storage device 210, over the network 220, while the processor 106 is in the offline state and the NIC 200 is supplied with the electrical power 201 and is active.

In an exemplary embodiment of the invention, while the computer system 100 is powered on and the processor 106 is in operational state, the offline engine 202 may be operable to copy select data, which is stored in the storage device 104, to the secondary storage device 210. The secondary storage device 210 may be accessible by the offline engine 202 while the processor 106 is in an offline state or not operational such as, for example, while the computer 100 and/or the processor 106 is powered off. The offline engine 202 may be operable to provide remote accessibility to the copy of the select data, which is stored in the secondary storage device 210, over the network, 220 while the processor 106 is in the offline state and the NIC 200 is supplied with the electrical power 201 and active. In this regard, for example, while the computer system 100 is powered off, the NIC 200 is still active whenever the AC power cord of the computer system 100 remains plugged in an AC power source. The copy of the select data stored in the secondary storage device 210 may be accessed, such as, for example, may be read, written and/or changed, via the active offline engine 202 by a user over the network 220 without having to keep the computer 100 and/or the processor 106 powered on and/or operational.

While the processor 106 is in the operational state, the select data stored in the storage device 104 may be identified by the offline engine 202 based on a chosen attribute option associated with the select data. The attribute option classifies the select data as offline available data. Whenever a change is made to the select data stored in the storage device 104, the offline engine 202 is operable to replace the copy of the select data, which is stored in the secondary storage device 210, with an updated copy of the select data based on the change. The select data may comprise, for example, a photo file, a music file, a library file, a video file and/or a document file.

After the power of the computer system 100 is turned on and/or the processor 106 changes from the offline state to the operational state, the offline engine 202 may be operable to compare the copy of the select data stored in the secondary storage device 210 with the select data stored in the storage device 104. The select data stored in the storage device 104 may be replaced with the copy of the select data stored in the secondary storage device 210 by the offline engine 202, based on a result of the comparison and/or a user configuration of the computer system 100. For example, in instances when a copy of a document file stored in the secondary storage device 210 has been changed, the offline engine 202 may be configured to replace the original document file stored in the storage device 104 with the changed copy of the document file. Alternatively, based on the user configuration, the original document file stored in the storage device 104 may remain unchanged and in turn, the offline engine 202 may be operable to replace the changed copy of the document file, which is stored in the secondary storage device 210, with the original document file stored in the storage device 104.

The NIC processor 204 may comprise suitable logic, circuitry, interfaces and/or code that may be operable to process network data. In an exemplary embodiment of the invention, the NIC processor 204 may communicate with the offline engine 202 to process data while the processor 106 in the computer system 100 is in the offline state or not operational.

The NIC memory 206 may comprise suitable logic, circuitry, interfaces and/or code that may be operable to store information such as executable instructions and data that may be utilized by the NIC processor 204. The NIC memory 206 may comprise RAM, ROM, low latency non-volatile memory such as flash memory and/or other suitable electrical data storage.

In operation, while the computer system 100 is powered on and the processor 106 is in operational state, the offline engine 202 may be operable to copy select data, which is stored in the storage device 104, to the secondary storage device 210. The secondary storage device 210 may be accessible by the offline engine 202 while the processor 106 is in an offline state or not operational such as, for example, while the computer 100 and/or the processor 106 is powered off. The offline engine 202 may be operable to provide remote accessibility to the copy of the select data stored in the secondary storage device 210 over the network 220 while the processor 106 is in the offline state and the NIC 200 is supplied with the electrical power 201 and active. In this regard, for example, while the computer system 100 is powered off, the NIC 200 is still active whenever the AC power cord of the computer system 100 remains plugged in an AC power source. The copy of the select data stored in the secondary storage device 210 may be accessed such as, for example, may be read, written and/or changed via the active offline engine 202 by a user over the network 220 without having to keep the computer 100 and/or the processor 106 powered on and/or operational.

While the processor 106 is in the operational state, the select data stored in the storage device 104 may be identified by the offline engine 202 based on a chosen attribute option associated with the select data. The attribute option classifies the select data as offline available data. Whenever a change is made to the select data stored in the storage device 104, the offline engine 202 is operable to replace the copy of the select data, which is stored in the secondary storage device 210, with an updated copy of the select data based on the change. The select data may comprise, for example, a photo file, a music file, a library file, a video file and/or a document file.

The secondary storage device 210 which is accessible by the offline engine 202 while the processor 106 is in an offline state may be, for example, local to the NIC 200. The secondary storage device 210 may also be, for example, remote with respect to the NIC 200. The secondary storage device 210 may comprise, for example, a plug-in memory card 210a that is coupled locally or remotely to the NIC 200, an EMMC 210b that is integrated in the computer system 100 and/or a NAS device 210c that is coupled to the network 220. For example, the plug-in memory card 210a may comprise a SD card that may be coupled to the NIC 200 via the card reader 203 which is integrated in the NIC 200. The plug-in memory card 210a such as the SD card may also be, for example, coupled to the NIC 200 remotely via the card reader 103b which may be integrated in the computer system 100. The EMMC 210b may comprise an embedded flash memory which may be, for example, integrated in a motherboard in the computer system 100. The NAS device 210c may comprise a file-based data storage device which may be, for example, coupled to the network 220.

After the power of the computer system 100 is turned on and/or the processor 106 changes from the offline state to the operational state, the offline engine 202 may be operable to compare the copy of the select data, which is stored in the secondary storage device 210, with the select data stored in the storage device 104. The select data stored in the storage device 104 may be replaced with the copy of the select data, which is stored in the secondary storage device 210 by the offline engine 202, based on a result of the comparison and/or a user configuration of the computer system 100. The user configuration may determine whether the select data may be updated or remain unchanged when the processor 106 changes from the offline state to the operational state. For example, in instances when a copy of a document file stored in the secondary storage device 210 has been changed, the offline engine 202 may be configured to replace the original document file stored in the storage device 104 with the changed copy of the document file. Alternatively, based on the user configuration, the original document file stored in the storage device 104 may remain unchanged and in turn, the offline engine 202 may be operable to replace the changed copy of the document file stored in the secondary storage device 210 with the original document file stored in the storage device 104.

Figure 3:
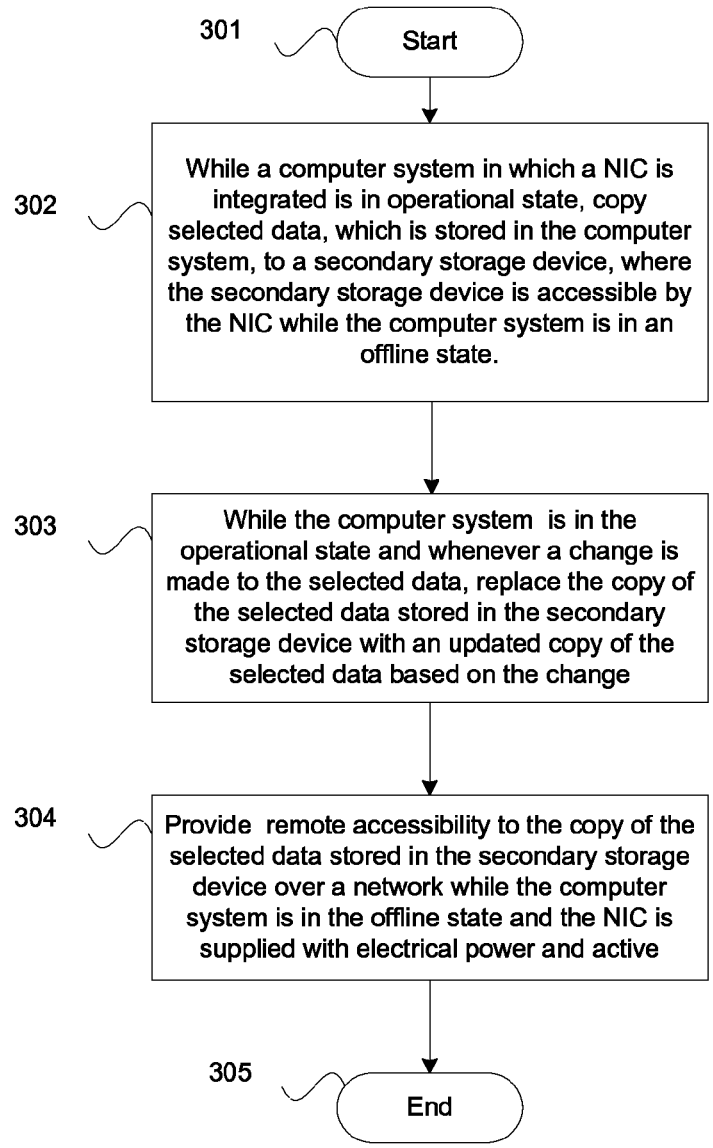
FIG. 3 is a flow chart illustrating exemplary steps for offline data access on a computer system, in accordance with an embodiment of the invention.

FIG. 3 is a flow chart illustrating exemplary steps for offline data access on a computer system, in accordance with an embodiment of the invention. Referring to FIG. 3, the exemplary steps start at step 301. In step 302, while a computer system 100 is in operational state, the NIC 102 in the computer system 100 may be operable to copy select data, which is stored in the computer system 100, to a secondary storage device 110. The secondary storage device 110 is accessible by the NIC 102 while the computer system 100 is in an offline state. In step 303, while the computer system 100 is in the operational state and whenever a change is made to the select data, the NIC 102 is operable to replace the copy of the select data stored in the secondary storage device 110 with an updated copy of the select data based on the change. In step 304, the NIC 102 is operable to provide remote accessibility to the copy of the select data stored in the secondary storage device 110 over a network 120 while the computer system 100 is in the offline state and the NIC 102 is supplied with electrical power 101 and active. The exemplary steps may proceed to the end step 305.

Figure 4:
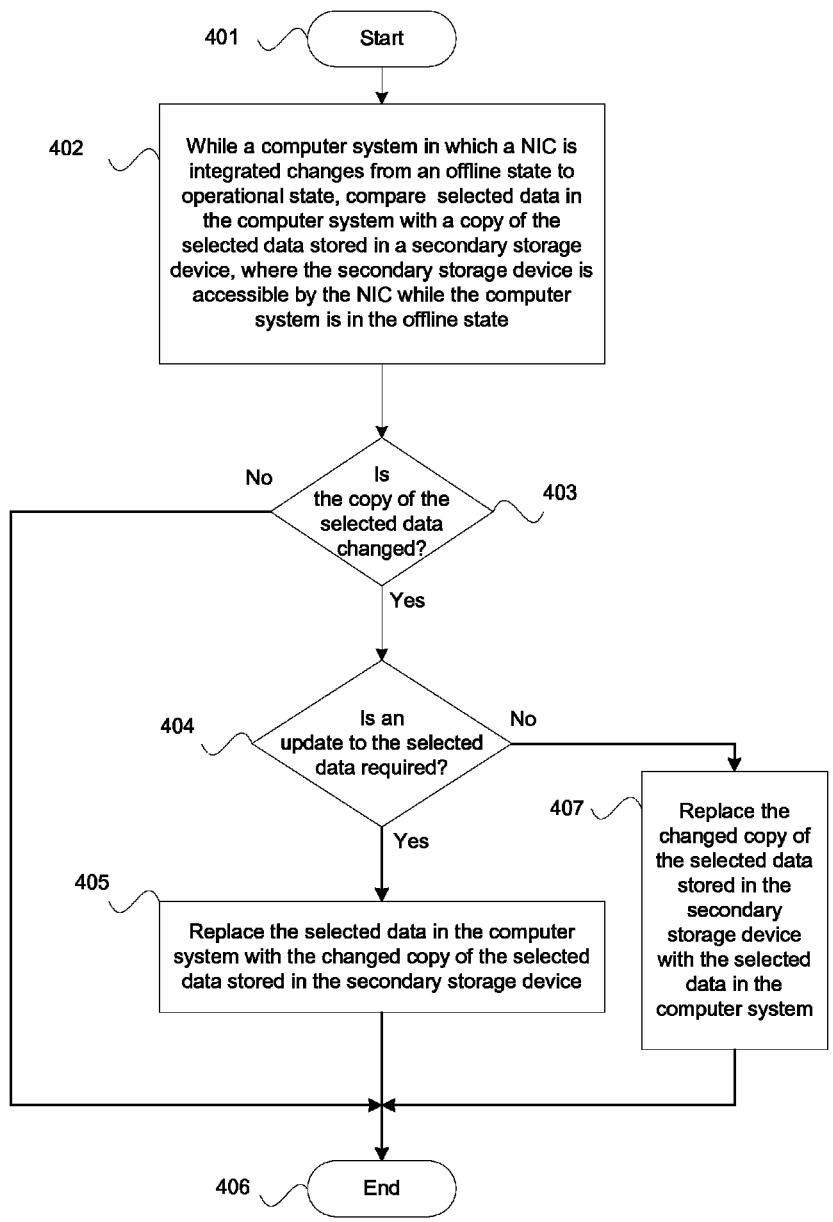
FIG. 4 is a flow chart illustrating exemplary steps for updating select data stored in a computer system while the computer system changes from an offline state to operational state, in accordance with an embodiment of the invention.

FIG. 4 is a flow chart illustrating exemplary steps for updating select data stored in a computer system while the computer system changes from an offline state to operational state, in accordance with an embodiment of the invention. Referring to FIG. 4, the exemplary steps start at step 401. In step 402, while a computer system 100 changes from an offline state to operational state, the NIC 102 in the computer system 100 may be operable to compare select data in the computer system 100 with a copy of the select data stored in a secondary storage device 110. The secondary storage device 110 is accessible by the NIC 102 while the computer system 100 is in the offline state. In step 403, it may be determined whether the copy of the select data stored in the secondary storage device 110 is changed. In instances when the copy of the select data has been changed, the exemplary steps may proceed to step 404. In step 404, it is determined whether an update to the select data in the computer system 100 is required. In instances when an update to the select data is required, the exemplary steps may proceed to step 405. In step 405, the NIC 102 may be operable to replace the select data in the computer system 100 with the changed copy of the select data stored in the secondary storage device 110. The exemplary steps may proceed to the end step 406. In step 403, in instances when the copy of the select data has not been changed, the exemplary steps may proceed to the end step 406. In step 404, in instances when an update to the select data is not required, the exemplary steps may proceed to step 407. In step 407, the NIC 102 may be operable to replace the changed copy of the select data stored in the secondary storage device 110 with the select data in the computer system 100. The exemplary steps may proceed to the end step 406.

In various embodiments of the invention, while a computer system 100 is in operational state, a NIC 102 in the computer system 100 may be operable to copy select data, which is stored in a storage device 104 in the computer system 100, and store the copied select data in a secondary storage device 110. The secondary storage device 110 is accessible by the NIC 102 while the computer system 100 is in an offline state or not operational. The storage device 104 in the computer system 100 is inaccessible by the NIC 102 when the computer system 100 is in the offline state. The NIC 102 may be operable to provide remote accessibility to the copy of the select data stored in the secondary storage device 110 over a network 120 while the computer system 100 is in the offline state and the NIC 102 is supplied with electrical power 101 and is active.

While the computer system 100 is in the operational state, the select data stored in the storage device 104 may be identified by the NIC 102 based on a chosen attribute option associated with the select data. The attribute option classifies the select data as offline available data. Whenever a change is made to the select data stored in the storage device 104, the NIC 102 is operable to replace the copy of the select data stored in the secondary storage device 110 with an updated copy of the select data based on the change. The select data may comprise, for example, a photo file, a music file, a library file, a video file and/or a document file.

The secondary storage device 110, which is accessible by the NIC 102 while the computer system 100 is in an offline state, may be, for example, local to the NIC 102. The secondary storage device 110 may also be, for example, remote with respect to the NIC 102. The secondary storage device 110 may comprise, for example, a plug-in memory card 110a that is coupled locally or remotely to the NIC 102, an EMMC 110b that is integrated in the computer system 100 and/or a NAS device 110c, which is coupled to the network 120.

While the computer system 100 changes from the offline state to the operational state, the NIC 102 may be operable to compare the copy of the select data stored in the secondary storage device 110 with the select data stored in the storage device 104. The select data stored in the storage device 104 may be replaced with the copy of the select data stored in the secondary storage device 110 by the NIC 102, based on a result of the comparison and/or a user configuration of the computer system 100.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for offline data access on computer systems.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for data communication, the method comprising:
　　selecting data by a network interface controller (NIC);
　　copying said selected data, by a processor that is powered on for an operational state, from a storage device to a secondary storage device coupled to a computer device, said NIC, said processor, and said storage device being included within said computer device;

accessing said secondary storage device by said NIC while said processor is powered off for an offline state, said storage device being inaccessible by said NIC when said processor is in said offline state, wherein said secondary storage device is remote with respect to said NIC; and providing, via said NIC, remote accessibility to said copied selected data stored in said secondary storage device while said processor is in said offline state and while said NIC is powered on for an active state.

2. The method according to claim 1, comprising, while said processor is in said operational state, identifying said selected data stored in said storage device based on a chosen attribute option associated with said selected data, wherein said chosen attribute option classifies said selected data as offline available data.

3. The method according to claim 1, comprising, while said processor is in said operational state and whenever a change is made to said selected data stored in said storage device, replacing said copied selected data stored in said secondary storage device with an updated copy of said selected data based on said change.

4. The method according to claim 1, wherein said secondary storage device comprises a plug-in memory card that is coupled locally or remotely to the NIC.

5. The method according to claim 1, wherein said secondary storage device comprises an embedded multimedia card (EMMC) that is integrated in said computer device.

6. The method according to claim 1, wherein said secondary storage device comprises a network-attached storage (NAS) device that is coupled to a network.

7. The method according to claim 1, comprising, while said processor changes from said offline state to said operational state:
  comparing said copied selected data stored in said secondary storage device with said selected data stored in said storage device; and
  replacing said selected data stored in said storage device with said copied selected data stored in said secondary storage device based on said comparison or a user configuration of said computer device.

8. The method according to claim 1, wherein said selected data is selected from a group consisting of a photo file, a music file, a library file, a video file and a document file.

9. A system for data communication, the system comprising:
  one or more processors, one or more circuits, or any combination thereof for use in a network interface controller (NIC) that is operational within a computer device, said one or more processors, one or more circuits, or any combination thereof, being operable to:
  select data by said NIC, said NIC being configured to provide an interface to a wireless network to facilitate communication by said processor over said wireless network;
  copy said selected data, while a processor is powered on for an operational state, from a storage device to a secondary storage device coupled to said computer device, said NIC, said processor, and said storage device being included within said computer device;
  access said secondary storage device by said NIC while said processor is powered off for an offline state, said storage device being inaccessible by said NIC when said processor is in said offline state; and
  provide, via said NIC, remote accessibility to said copied selected data stored in said secondary storage device over said wireless network while said processor is in said offline state and while said NIC is powered on for an active state.

10. The system according to claim 9, wherein, while said processor is in said operational state, said one or more processors, one or more circuits, or any combination thereof are operable to identify said selected data stored in said storage device based on a chosen attribute option associated with said selected data, wherein said chosen attribute option classifies said selected data as offline available data.

11. The system according to claim 9, wherein, while said processor is in said operational state and whenever a change is made to said selected data stored in said storage device, said one or more processors, one or more circuits, or any combination thereof are operable to replace said copied selected data stored in said secondary storage device with an updated copy of said selected data based on said change.

12. The system according to claim 9, wherein said secondary storage device is local to said NIC.

13. The system according to claim 9, wherein said secondary storage device is remote with respect to said NIC.

14. The system according to claim 9, wherein said secondary storage device comprises a plug-in memory card that is coupled locally or remotely to the NIC.

15. The system according to claim 9, wherein said secondary storage device comprises an embedded multimedia card (EMMC) that is integrated in said computer device.

16. The system according to claim 9, wherein said secondary storage device comprises a network-attached storage (NAS) device that is coupled to a network.

17. The system according to claim 9, wherein, while said processor changes from said offline state to said operational state, said one or more processors, one or more circuits, or any combination thereof, are operable to:
  compare said copied selected data stored in said secondary storage device with said selected data stored in said storage device; and
  replace said selected data stored in said storage device with said copied selected data stored in said secondary storage device based on said comparison or a user configuration of said computer device.

18. The system according to claim 9, wherein said selected data is selected from a group consisting of a photo file, a music file, a library file, a video file and a document file.

19. A computer device comprising:
  means for selecting data by a network interface controller (NIC);
  means for copying selected data, by a processor that is powered on for an operational state, from a storage device to a secondary storage device coupled to said computer device, said NIC, said processor, and said storage device being included within said computer device;
  means for accessing said secondary storage device by said NIC while said processor is powered off for an offline state, said storage device being inaccessible by said NIC when said processor is in said offline state; and
  means for providing, via said NIC, remote accessibility to said copied selected data stored in said secondary storage device over an internet network to a remote computer device while said processor is in said offline state and while said NIC is powered on for an active state.

* * * * *